US006758312B2

(12) United States Patent
Heiland

(10) Patent No.: US 6,758,312 B2
(45) Date of Patent: Jul. 6, 2004

(54) APPARATUS AND METHOD FOR VIBRATION-ISOLATING BEARING OF LOADS

(76) Inventor: Peter Heiland, Karl-Liebknecht-Strasse 30, D-65479 Raunheim (DE)

( * ) Notice: Subject to any disclaimer, the term of this patent is extended or adjusted under 35 U.S.C. 154(b) by 0 days.

(21) Appl. No.: 10/131,297

(22) Filed: Apr. 23, 2002

(65) Prior Publication Data

US 2002/0185796 A1 Dec. 12, 2002

(51) Int. Cl.$^7$ .............................. H01J 37/00; F16F 7/10
(52) U.S. Cl. ...................... 188/378; 267/136; 248/550
(58) Field of Search .............................. 188/266.7, 378, 188/379, 380; 248/550, 566; 267/140.14, 140.15

(56) References Cited

U.S. PATENT DOCUMENTS

| | | | | |
|---|---|---|---|---|
| 4,909,535 A | * | 3/1990 | Clark et al. ................. 280/707 |
| 5,042,162 A | * | 8/1991 | Helms ......................... 248/559 |
| 5,730,429 A | * | 3/1998 | Ivers et al. ............. 267/140.14 |
| 5,811,821 A | * | 9/1998 | Alexander et al. .......... 248/550 |
| 5,823,307 A | * | 10/1998 | Schuber et al. ............. 188/378 |
| 5,906,254 A | * | 5/1999 | Schmidt ...................... 188/378 |
| 6,378,672 B1 | * | 4/2002 | Wakui ......................... 188/378 |

* cited by examiner

Primary Examiner—Christopher P. Schwartz

(57) ABSTRACT

An active system for isolating vibrations includes: at least one first vibratio-isolating device, arranged between a load and a sstanding surface, for at least partially decoupling the static and dynamic forces acting between the load and the standing surface, the first vibration-isolating device includes a passively isolating coupling element for mechanically decoupling the static and dynamic forces including a natural frequency; at least one second vibration-isolating device, assigned to the load, for imparting control forces to the load for actively damping the substantially decoupled dynamic forces, the second fibratio-isolating device including a coupling element for dynamically coupling said second vibration-isolating device to the load and the first isolating device<the coupling element including a natural frequency; means for tuning the control forces of the second vibratio-isolating device and the natural frequencies, wherein the control forces of the second vibration-isolating device and the natural frequencies are determined by means of characteristic curves describing the functional dependency of the control forces to the natural frequencies of the passively isolating doupling element and the ratio of the natural frequencies.

18 Claims, 2 Drawing Sheets

APPARATUS AND METHOD FOR VIBRATION-ISOLATING BEARING OF LOADS

CROSS-REFERENCES TO RELATED APPLICATIONS

Not applicable.

STATEMENT REGARDING FEDERALLY SPONSORED RESEARCH OR DEVELOPMENT

Not applicable.

BACKGROUND OF THE INVENTION

The invention relates to an apparatus for vibration-isolating bearing of loads including at least one first vibration-isolating device, arranged between a load and a standing surface, for at least partially decoupling the static and dynamic forces acting between the load and the standing surface, the first vibration-isolating device comprising a passively isolating coupling element for mechanically decoupling the static and dynamic forces including a natural frequency, at least one second vibration-isolating device, assigned to the load, for imparting control forces to the load for actively damping the substantially decoupled dynamic forces, said second vibration-isolating device comprising a coupling element for dynamically coupling the second vibration-isolating device to the load and the first isolating device, said coupling element including a natural frequency; means for tuning the control forces of the second vibration-isolating device and the natural frequencies, wherein the control forces of the second vibration-isolating device and the natural frequencies are determined by means of characteristic curves describing the functional dependency of the control forces to the natural frequencies of the passively isolating coupling element and the ratio of the natural frequencies. The invention also relates to a method for isolating vibrations of loads, comprising the following steps:

providing at least one first vibration-isolating device for at least partial decoupling of the static and dynamic forces acting between the load and a standing surface with a passively isolating coupling element including a natural frequency, providing a second vibration-isolating device for imparting control forces to the load, comprising a coupling element for coupling the second vibration-isolating device to the load, the coupling element including a natural frequency, tuning the control forces of the second vibration-isolating device and the natural frequencies, wherein the control forces of the second vibration-isolating device and the natural frequencies are determined by means of characteristic curves describing the functional dependency of the control forces to the natural frequencies of the passively isolating coupling element and the ratio of the natural frequencies, providing the control force of the second vibration-isolating device and the natural frequencies of the coupling elements imparting the tuned control force to the load for actively damping the at least partially decoupled dynamic forces.

DESCRIPTION OF RELATED ART

Undesired vibrations and shocks are to be found in a multiplicity of technical applications. Such disturbing vibrations have a negative effect, in particular, in the case of highly sensitive, or else very heavy technical units. A computer tomograph weighing several tons may be named by example. An attempt is made to prevent the transmission of vibrations to such machines by what is termed isolation of vibrations. In this case, a purely passive isolation, for example, by the use of a spring, is frequently employed. However, such systems are no longer adequate for particularly heavy loads and for sensitive units, in particular. Consequently, there is an increased shift to the use of what are termed as active systems. The use of active systems for isolating vibrations is highly limited according to the prior art by the very restricted availability of suitable actuators. Specifically, the prior concepts have proceeded from the fact that the actuator or actuators used would have to act directly on the loads for the purpose of isolating vibrations, and so, as a result, they must always bear the entire weight of the installation in order to obtain an adequate isolation of vibrations. As a consequence of this prevailing view, it has been impossible to date to use a multiplicity of actuators that would be suitable in principle for isolating vibrations because of their technical and physical properties within the scope of the prior vibration isolating systems. In particular, these are here what are termed piezoelectric translators or ceramic solid-state actuators that can convert electric energy directly into mechanical energy and vice versa. Piezoelectric actuators can be used only in a very restrictive fashion, if at all, in the existing systems. The reason for this is that piezoelectric actuators for large static loads are, on the one hand, virtually unavailable industrially and, on the other hand, provide only a slight stroke and static loadability.

BRIEF SUMMARY OF THE INVENTION

It is therefore the object of the invention to provide an apparatus for active isolation of vibrations that can be used flexibly for isolating vibrations of loads of different weight and, in particular, permits the use of actuators for isolating vibrations that it has not yet so far been possible to use under the conditions of the prior art.

This object is achieved in the most surprising way by an active system for isolating vibrations having at least one first vibration-isolating device, arranged between a load and a standing surface, for at least partially decoupling the static and dynamic forces acting between the load and the standing surface, the first vibration-isolating device comprising a passively isolating coupling element for mechanically decoupling the static and dynamic forces including a natural frequency, at least one second vibration-isolating device, assigned to the load, for imparting control forces to the load for actively damping the substantially decoupled dynamic forces, the second vibration-isolating device comprising a coupling element for dynamically coupling the second vibration-isolating device to the load and the first isolating device, the coupling element including a natural frequency, means for tuning the control forces of the second vibration-isolating device and the natural frequencies, wherein the control forces of the second vibration-isolating device and the natural frequencies are determined by means of characteristic curves describing the functional dependency of the control forces to the natural frequencies of the passively isolating coupling element and the ratio of the natural frequencies.

The method is carried out according to the invention, which includes providing at least one first vibration-isolating device for at least partial decoupling of the static and dynamic forces acting between the load and a standing surface with a passively isolating coupling element including a natural frequency;

providing a second vibration-isolating device for imparting control forces to the load, comprising a coupling element for coupling the second vibration-isolating device to the load, the coupling element including a natural frequency;

tuning the control forces of the second vibration-isolating device and the natural frequencies, wherein the control forces of the second vibration-isolating device and the natural frequencies are determined by means of characteristic curves describing the functional dependency of the control forces to the natural frequencies of the passively isolating coupling element and the ratio of the natural frequencies;

providing the control force of the second vibration-isolating device and the natural frequencies of the coupling elements;

imparting the tuned control force to the load for actively damping the at least partially decoupled dynamic forces.

By virtue of the fact that the invention provides an apparatus that comprises at least one first vibration-isolating device, arranged between a load and a standing surface, for at least partially decoupling the static and dynamic forces acting between the load and the standing surface, and includes at least one second vibration-isolating device assigned to the first one and/or the load, for absorbing the substantially decoupled dynamic forces, the possibility arises for the first time that the dynamic forces acting on the apparatus and/or originating from the apparatus can be decoupled substantially from the static forces in a fashion actively isolating vibrations.

In this context, the apparatus according to the invention comprises at least one dynamic coupling element for the purpose of mechanical decoupling of the vibration-isolating devices. Within the purpose of the invention, the coupling element has a property that it can vibrate both in the vertical and horizontal directions, and thereby ensures, inter alia, passive isolation of vibrations.

In a development of the invention, this can be implemented, in particular, by a rubber spring. In a particularly advantageous development of the subject matter of the invention, the rubber spring can comprise a rubber combination or a plurality of interconnected rubber springs.

In a further development of the subject matter of the invention, the vibration-isolating devices according to the invention are arranged and/or tuned with reference to one another and with reference to the load such that the coupling elements assigned to the vibration-isolating devices alternately effect a dynamic coupling between the vibration-isolating devices and the load.

If, to this extent, a passive isolation of vibrations is set up for the first vibration-isolating device, the first device advantageously substantially bears the complete static load. Furthermore, through its physical properties, the passive isolation substantially defines the vibrational dynamics of the apparatus according to the invention. In this case, it is particularly the degree of damping of the coupling element, or in the case of the use of rubber, the stiffness thereof that are to be considered as parameters. Also important, in addition, are, of course, the weight bearing on the passive isolation and, in some circumstances, also the bearing surface of a coupling element on the floor.

It also holds in this context that, according to the invention, the second vibration-isolating device likewise very advantageously comprises a coupling element in such a way that, with reference to the load, stresses that can occur in particular between the second vibration-isolating device and the load can be reduced or even eliminated.

In a positive development of the subject matter of the invention, the coupling element according to the invention can, of course, be fitted not only with rubber springs. In this connection, of course, it would also be possible to use coupling elements in the form, for example, of metal springs, air cushions and/or magnetic levitation devices.

It has proved to be particularly advantageous within the scope of the invention that the dynamic coupling can very positively be set via the physical and/or technical parameters of the coupling elements, and that, in particular, dynamic transmission of force can very advantageously be set, in particular, to the second vibration-isolating device via the setability of the coupling. There is the particularly positive possibility in this way, above all, of setting the force that can be transmitted by the second vibration-isolating device, in particular to the load. In this case, it is possible, above all, in this way also to set the force that can be transmitted by the second vibration-isolating device, in particular to the load. Moreover, however, there is also the possibility in this case to exert a positive influence on the vibration amplitude of the dynamic vibration produced by the dynamic transmission of force such that said dynamic vibration can be set.

In particular, within the scope of the invention, the above-described measures permit the specific adaptation of, for example, building vibration or floor vibration to the isolation of vibration that is to be provided with reference to the technical and physical parameters of the actuators to be used for the purpose of active isolation of vibrations.

In the case of the use of a plurality of rubber springs for the vibration-isolating devices according to the invention, it has proved that in addition, above all, to the stiffness of the rubber in the coupling element of the second vibration-isolating device, the ratio of the rubber stiffness of the individual springs, in particular, can also be a very good measure of the transmission of force. In this case, the stifffiess can be expressed, in particular, by the natural frequencies of the coupling elements or by the natural frequencies of the rubber.

It was possible in the case of the invention also to show that the dynamic transmission of force can be determined in a very simple way from one or more characteristics that reproduce the functional relationship between the natural frequency of the coupling element of the first vibration-isolating device and the ratio of the natural frequency of the coupling element of the first vibration-isolating device to the natural frequency of the coupling element of the second vibration-isolating device. Within the scope of the invention, it is particularly easy in this way, for example given the knowledge of the potential transmission of force, to use the characteristic or characteristics to define and/or select the suitable coupling elements and/or the suitable actuators. Conversely, when the natural frequencies of the coupling elements are given it is also possible, of course, to use the characteristics to determine the possible transmission of force.

The invention renders it possible for the first time, on the basis of the settability and/or determinability of the dynamic transmission of force or of the dynamic vibration with reference to the load to be borne, to make use, for the purpose of active isolation of vibrations, of actuators that have so far not yet been capable of use for vibration isolating systems because of their technical parameters. For this purpose, standard piezoelectric modules and/or piezoelectric actuators are used according to the invention for the purpose of active isolation of vibrations in a development of the subject matter of the invention. The point is that it is possible according to the invention to compensate the properties of piezoelectric actuators previously regarded as disadvantageous: low loadability with respect to static forces, and small stroke. In this case, the piezoelectric modules in the apparatus can be arranged very advantageously such that they exert an active vibration-isolating effect in all directions in space.

In a further development of the subject-matter of the invention, the latter comprises an additional load-bearing means that is assigned, in particular, to the first vibration-isolating device for bearing the load. The load-bearing means according to the invention offers the advantage that the weight of a load lying on it can be distributed uniformly over a plurality of vibration-isolating devices according to the invention. Moreover, such a load-bearing means offers the possibility of producing a local mechanical coupling between the first vibration-isolating device and the second vibration-isolating device.

Furthermore, it lies within the scope of the invention to provide a system that not only has only actuator properties, but also has tensile properties. It is therefore provided according to the invention also to fit the apparatus with a vibration-sensing unit. According to the invention, the latter transmits the exciting movement to the load to be isolated, and also the vibrations that are caused by disturbing forces that act on the load. For the purpose of active isolation of vibrations, within the scope of the invention, the excitations of vibration are fed back to the second vibration-isolating device via a feedback control and/or forward control, in order thus to compensate and/or damp the undesired vibrations.

To this extent, in addition to an active system or apparatus in the case of which the actuator is addressed in terms of regulation and/or control for the purpose of damping vibrations, the present invention also comprises what is termed an adaptive system or adaptive apparatus with sensor and actuator properties that can simultaneously also take over bearing functions and whose multifunctionality also relies on the fact that on the basis of the possibility of using the most varied actuators it permits very flexible and cost effective individual solutions to the active isolation of vibrations of arbitrary loads.

The scope of the invention also includes, of course, a method for isolating vibrations of loads, particular of heavy loads. In this case, the static and dynamic forces originating from a load or acting on the latter are at least partially decoupled, and the dynamic forces thus decoupled are subsequently separately damped. The decoupling of the forces is performed in the course of the passive isolation of the load. The vibrations occurring during the passive isolation are coupled to at least one actuator. This coupling is advantageously performed to the actuator via a spring. It is particularly positive in this context that according to the invention the transmission of force for the actuator can be determined from one characteristic of dependence of the natural frequency of vibration of the passive isolation on the ratio between the natural frequency of the spring with reference to the actuator and the natural frequency of the passive isolation.

BRIEF DESCRIPTION OF THE SEVERAL VIEWS OF THE DRAWINGS

The invention is explained in detail below with the aid of various drawings, in which.

DETAILED DESCRIPTION OF THE DRAWINGS

Figure 1:
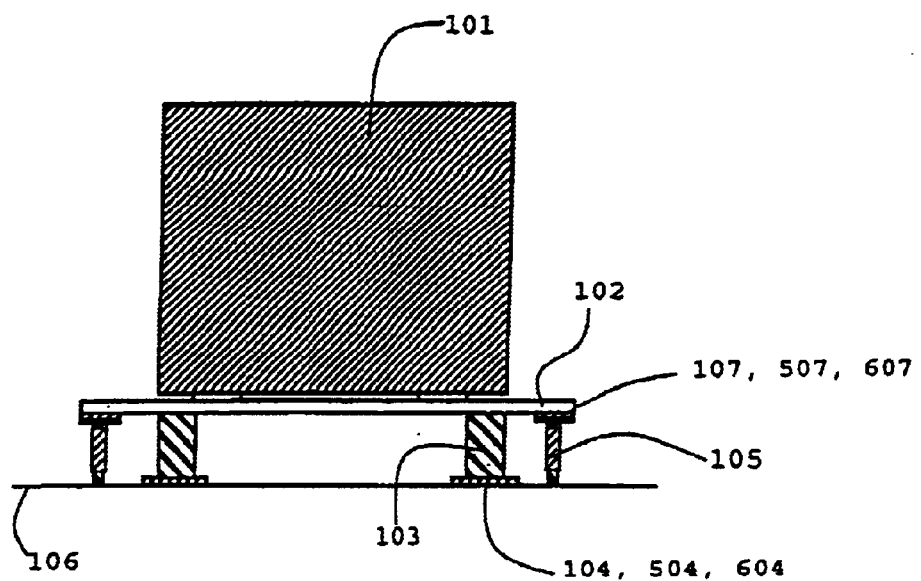
FIG. 1 shows a schematic of the apparatus according to the invention, in the case of which an isolation of vibrations is provided.

A load 101 that is borne via a surface 102 by supports 103 and 105 is illustrated in FIG. 1. The support 103 is passively isolated from vibrations in respect to the floor 106 by a rubber spring 104. The support 105 is what is termed a piezoelectric actuator. The static load 101, for example that of a magnetic resonance apparatus, is borne substantially completely by the support 103. The support 103 stands on a rubber mat 104 or rubber spring or the like for the purpose of decoupling the dynamic vibrations from the static load 101. In addition to the support 103, the piezoelectric actuator 105 also bears against the underside of the bearing surface 102.

Figure 2:
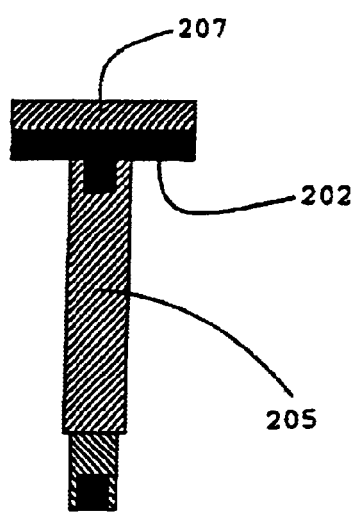
FIG. 2 shows a cross section of the piezoelectric actuator module used within the scope of the invention.

Consequently, even when the piezoelectric actuator 105 essentially bears no static load 101, undesired vibrations that act on the supports 103 and/or on the bearing surface 102 are also transmitted to the piezoelectric actuator 105. The piezoelectric actuator 105 is further likewise connected to the floor 106. A rubber spring 107 is mounted between the bearing surface 102 and actuator 105 for the purpose, in particular, of avoiding stresses and/or distortions between the supporting surface 102 and the piezoelectric actuator 105. Apart from rubber springs 104 and/or 107 a coupling element can comprise other devices, for instance air cushions 504 and/or 507 and/or magnetic levitation devices 604 and/or 607. The rubber spring 107 is to be gathered better from FIG. 2, where the piezoelectric actuator 105 used in the scope of this exemplary embodiment is illustrated in detail. It is possible for the first time on the basis of the above-described decoupling of static and dynamic forces, only the dynamic forces being fed to the actuator 105 via an appropriate spring coupling 107, to make use, for the purpose of active isolation of vibrations, of standard actuators with a comparatively slight transmission of force and stroke. This is supported, in particular, also by the fact that the actuator 105 is not readily connected to the bearing table 102 and/or the load 101 and support 103, but is coupled dynamically to these, that is to say with the aid of a rubber spring 107. The strength of this coupling is determined, in particular, by the stiffness of the rubber 207 used (FIG. 2) and/or of the spring used, and by the coupling surface 202 of the actuator 205 at the support surface 102.

On the basis of its damping property and/or stiffness, the supporting rubber 104 influences the natural frequency of the apparatus according to the invention, and thus likewise the vibration dynamics transmitted to the piezoelectric actuator 105. However, this means as a result that the transmission or force to and from the piezoelectric actuator 105 and the vibration amplitude of the piezoelectric actuator 105 can be manipulated specifically by suitable selection of the rubber springs 104 and 107. The natural frequencies of the respective rubber springs 104, 107, whose frequency is a function, inter alia, of the support surface, of the load and of the type of rubber selected, are available as suitable parameters in this case.

The natural frequency of the supporting rubber is frequently already prescribed in practice in this case. The spring at the piezoelectric actuator 107, 207 is then adapted thereto. It can basically be selected freely, the rubber used and the stiffness thereof determining the transmission of force to and from the piezoelectric actuator. It may be pointed out in this regard that the stiffness of the rubber also, of course, depends on the inherent stiffness of the piezoelectric actuator 105. The piezoelectric actuator 105 should generally not work against a stiffness that is greater than a tenth of its inherent stiffnless.

The ratio between the natural frequency of the supporting rubber 104 and that of the piezoelectric rubber 107 has proved to be a particular suitable parameter within the scope of a particular embodiment of the invention for the purpose of tuning the supporting rubber 104 to the rubber 107 attached to the piezoelectric actuator 105. It was chiefly the support surface of the rubber 107 against the table 102 that was varied in the case. Given such a tuning, the different rubbers 104, 107 can, for example, also comprise the same types of rubber.

Figure 3:
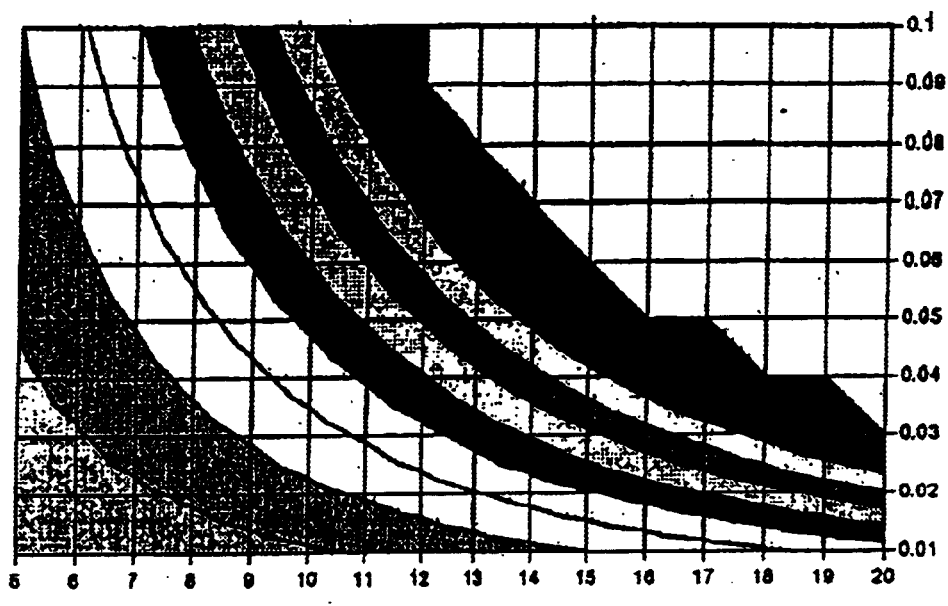
FIG. 3 shows diagram with force transmission characteristics of the piezoelectric actuator in the case of differing designs of the stiffness of the rubber springs.

Various characteristics may be gathered for this purpose from the diagram according to FIG. 3, and it is possible to gather from these the necessary transmission of power of the piezoelectric actuator 105 as a function of the natural frequency of the supporting rubber 104 and the ratio of the stiffnesses of the rubbers 104, 107 or the ratio between their natural frequencies. The natural rubber frequencies are specified in Hertz on the abscissa in the diagram. The stiffness ratio of the rubbers can be read off on the ordinate. The individual characteristics were respectively determined for the purpose of determining a defined transmission of force of the piezoelectric actuator to the load. Force transmission regions were also illustrated in the diagram by means of different shading. These regions move in the diagram from the left lower corner in the direction of the right upper corner in 50-newton steps from 0 newton to 500 newtons. Thus, for example, the diagram according to FIG. 3 can be used to read off that, in the case of a technically conditioned transmission of force of 200 newtons, the natural frequency of the rubber must be approximately 15 Hz, and the ratio of the natural rubber frequencies should be at a value of approximately 0.02. Of course, the selection of the suitable actuator must also take account of the vibration amplitude caused by the transmission. However, there is basically no limit set by the multiphase tuning possibilities of the use of the most varied actuators and piezoelectric actuators.

In addition to the purely vertical isolation of vibrations illustrated in FIG. 1, an active isolation of vibrations in the horizontal can also be achieved by the fitting of, for example, three further, horizontally mounted actuators that act on the mass. In this case, the actual isolation of vibrations is implemented by virtue of the fact that the undesired vibrations and shocks (harmonic or stochastistic) are detected by the use of suitable sensors at the mass to be isolated and at the standing surface of the mass, in order then to be guided to an actuator via a controller.

Figure 4:
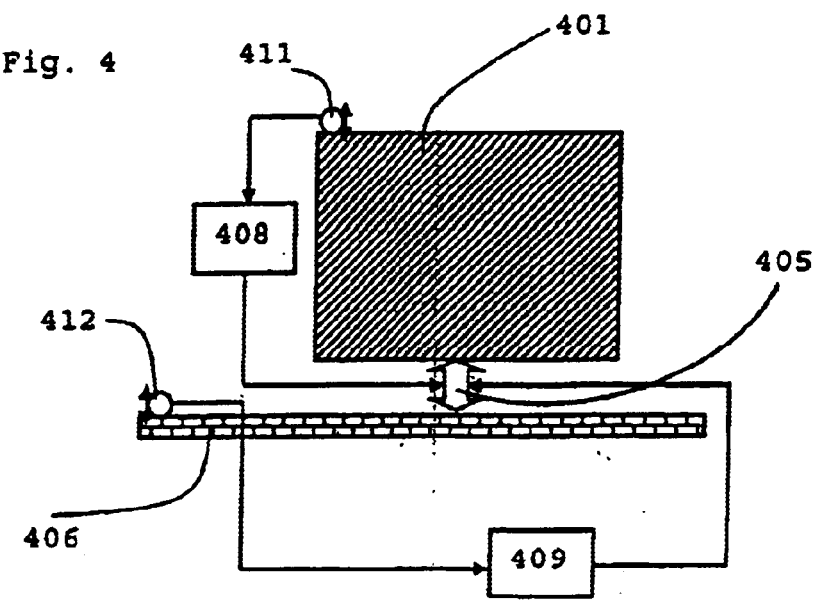
FIG. 4 shows a schematic of the control system used within the scope of the invention.

The control variants that can be used in this case are illustrated schematically in FIG. 4. The aim of the isolation of vibrations is to minimize the absolute movement of the isolation member 401 by the use of the isolation actuators 105 (FIG. 1). It is necessary for this purpose, on the one hand, to prevent transmission of the exciting movement to the isolation member 401, and, on the other hand, vibrations that result from disturbing forces acting on the isolation member 401 must be damped. This is achieved by using two possible concepts. In this case, these are what is termed feedback control, on the one hand, and forward control, on the other. The feedback control is the classic variant of vibration control, in the case of which sensor signals from sensors 411 on the moving mass 401 are used and are conditioned by one or more controllers 408 and fed back to the actuators 405. In the case of a forward control, sensor signals from sensors 412 on the floor 406 or at the installation site of the actuators 405 and the mass 401 are used and are conditioned by a controller 409 and led forward to the actuators 405. The isolation of vibrations of the member 401 can be performed in this context with reference to the excitation via disturbance variable compensation, for example. This is achieved, inter alia, by pilot control of the speed of excitation and the acceleration. The corresponding data can be obtained, for example, from acceleration sensors 411, 412. For this case, in this case purpose, the detected data are to be filtered correspondingly and integrated over time, in order to be able to determine the rate and the deflection of the measuring point.

It may be pointed out expressly once again at this juncture that in addition to the exemplary embodiment illustrated the concept according to the invention of the isolation of vibrations can be used in the most varied applications. What is termed stage isolation may be mentioned further as an example, in the case of which loads in the kilogram or 100 kilogram region are to be isolated on a movable table.

What is claimed is:

1. An active system for isolating vibrations, comprising:
   at least one first vibration-isolating device, arranged between a load and a standing surface, for at least partially decoupling the static and dynamic forces acting between the load and the standing surface, said first vibration-isolating device comprising a passively isolating coupling element for mechanically decoupling the static and dynamic forces including a natural frequency;
   at least one second vibration-isolating device, assigned to the load, for imparting control forces to the load for actively damping the substantially decoupled dynamic forces, said second vibration-isolating device comprising a coupling element for dynamically coupling said second vibration-isolating device to the load and the first isolating device, said coupling element including a natural frequency;
   means for tuning the control forces of the second vibration-isolating device and the natural frequencies, wherein the control forces of the second vibration-isolating device and the natural frequencies are determined by means of characteristic curves describing the functional dependency of the control forces to the natural frequencies of the passively isolating coupling element and the ratio of the natural frequencies.

2. The apparatus as claimed in claim 1, wherein said second vibration-isolating device is assigned to the first vibration-isolating device.

3. The apparatus as claimed in claim 1, wherein the coupling element comprises both vertical and horizontal vibrational capabilities.

4. The apparatus as claimed in claim 1, wherein the coupling element comprises a rubber spring or a rubber spring combination.

5. The apparatus as claimed in claim 1, wherein the coupling element comprises an air cushion and/or magnetic levitation device.

6. The apparatus as claimed in claim 1, wherein a vibration amplitude of a dynamic vibration can be set via the setting of the physical and technical parameters of the coupling elements.

7. The apparatus as claimed in claim 1, wherein the apparatus comprises a control device.

8. The apparatus as claimed in claim 1, wherein the apparatus comprises at least one piezoelectric module for active isolation of vibrations.

9. The apparatus as claimed in claim 8, wherein the piezoelectric modules in the apparatus are arrangeable such that the piezoelectric modules exert an active vibration-isolating effect in all directions.

10. The apparatus as claimed in claim 1, wherein the apparatus comprises a load-bearing means.

11. The apparatus as claimed in claim 1, wherein the apparatus includes a vibration-sensing unit.

12. The apparatus as claimed in claim 1, wherein the apparatus comprises a regulating device.

13. The apparatus as claimed in claim 1, wherein the isolation of vibrations is implementable by means of feedback control.

14. The apparatus as claimed in claim 1, wherein the isolation of vibrations are implementable by means of forward control.

15. A method for isolating vibrations of loads, comprising the following steps:
 a) providing at least one first vibration-isolating device for at least partial decoupling the static and dynamic forces acting between the load and a standing surface with a passively isolating coupling element including a natural frequency,
 b) proving a second vibration-isolating device for imparting control forces to the load, comprising a coupling element for coupling the second vibration-isolating device to the load, said coupling element including a natural frequency,
 c) tuning the control forces of the second vibration-isolating device and the natural frequencies, wherein the control forces of the second vibration-isolating device and the natural frequencies are determined by means of characteristic curves describing the functional dependency of the control forces to the natural frequencies of the passively isolating coupling element and the ratio of the natural frequencies,
 d) providing the control force of the second vibration-isolating device and the natural frequencies of the coupling elements
 e) imparting the tuned control force to the load for actively damping the at least partially decoupled dynamic forces.

16. The method as claimed in claim 15, wherein the second vibration-isolating device comprises at least one actuator.

17. An active system for isolating vibrations, realized by the method as claimed in claim 15.

18. An adaptive system for isolating vibration, realized by the method as claimed in claim 15.

* * * * *